2,832,053
MICROWAVE APPARATUS AND METHODS UTILIZING GAS CELLS

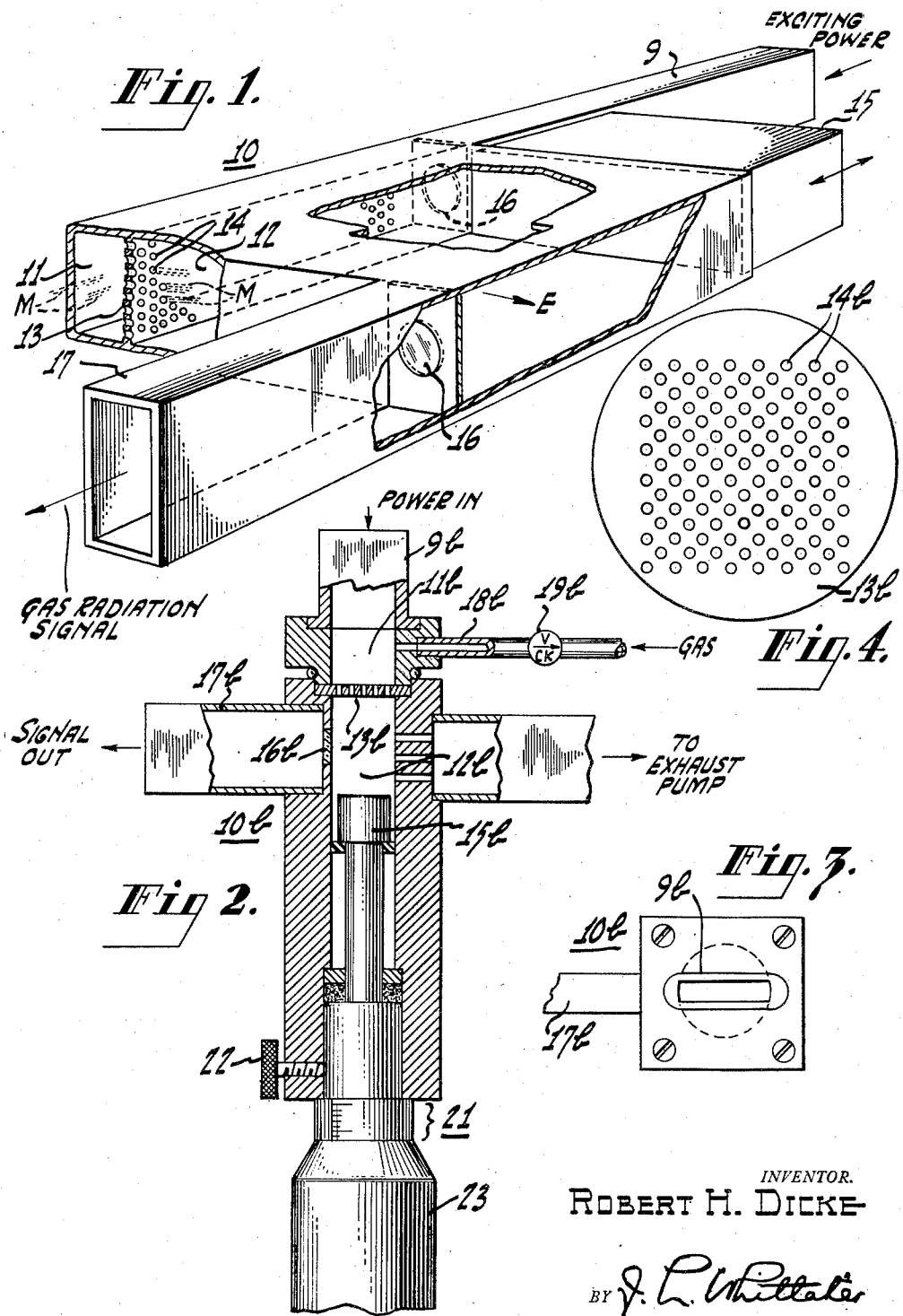

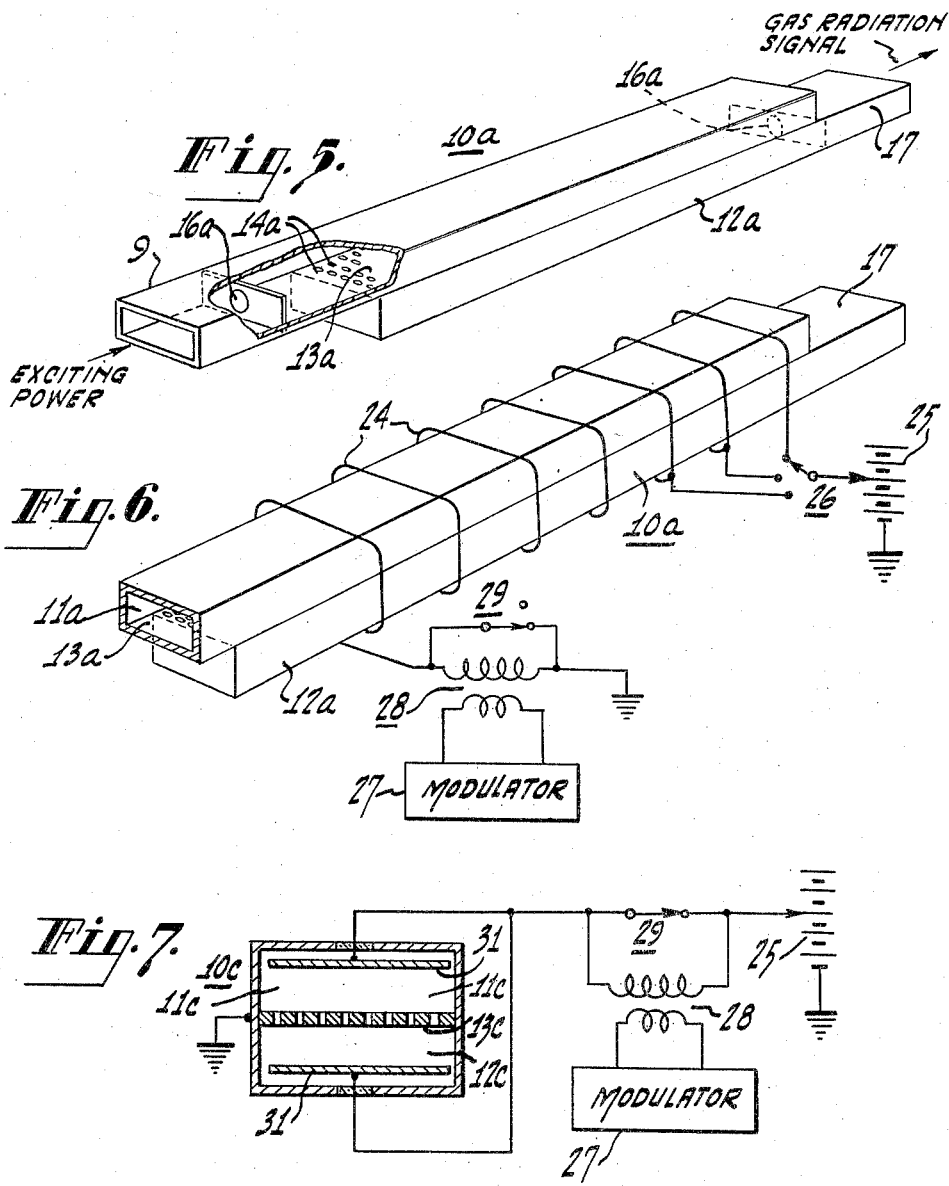

Robert H. Dicke, Princeton, N. J.

Application October 27, 1953, Serial No. 388,489

17 Claims. (Cl. 332—57)

This invention relates to microwave apparatus and methods in which there are utilized molecular resonance effects exhibited by various gases at microwave frequencies.

In accordance with the present invention, a body of gas confined at suitably low pressure is excited in a first zone by microwave energy and the excited gas molecules permitted to diffuse into a second zone, there to serve as a source of radiation at a molecularly resonant frequency of the gas.

More specifically and in accordance with apparatus aspects of the invention, there is provided a gas cell having a common apertured wall separating two chambers respectively serving as an excitation cavity and a radiation cavity. As substantially the only transfer of microwave energy between its cavities is that due to excited gas molecules which freely pass through the diffusion wall, such gas cell has unique properties particularly adapting it for use at microwave frequencies as a high-Q filter, a modulator, a mixer or the like.

For a more detailed understanding of the invention and for illustration of various embodiments thereof, reference is made to the accompanying drawings in which:

Fig. 1 is a perspective view, partly in section, of a dual cavity gas cell;

Fig. 2 is a side elevational view, partly in section, of a modification of Fig. 1;

Fig. 3 is a plan view of the cell of Fig. 2;

Fig. 4 is a plan view, on enlarged scale, of the diffusion screen of Fig. 2;

Fig. 5 is a plan view, partly in section, of a gas-cell microwave filter; and

Figs. 6 and 7 schematically illustrate an arrangement for shifting the pass frequency of the filter of Fig. 5.

Referring to Fig. 1, the gas cell 10 comprises two cavities 11, 12 having a common apertured wall 13. Continuous or pulsed microwave energy is supplied to cavity 11 as by waveguide 9. The wall or screen 13 common to the two cavities precludes any appreciable direct transfer of the microwave energy from cavity 11 to cavity 12 but permits diffusion of gas between the two cavities. The gas confined in cell 10 is at low pressure, for example, 0.01 millimeter of mercury or less so that the mean free path of the gas molecules is of the order of the cell dimensions. The gas may be ammonia, ethylchloride, ethyl oxide, carbonyl sulphide or other gas whose molecules have oscillatory dipole moments excited when the gas is subjected to microwave energy.

For purpose of explanation, it is assumed a molecule M in exciting cavity 11 is moving to the right just after having collided with the left-hand wall of cavity 11. During such collision, thermal equilibrium was established, i. e., the molecule exists in one or the other of two possible energy states with the probability of being in a lower energy state greater than the probability of being in the higher energy state. In continuing its movement to the right across cavity 11 to wall 13, the molecule M is excited by the microwave energy into a state for which it possesses an oscillatory electric dipole moment, the dipole moment oscillating at a natural frequency characteristic of the gas. Such oscillation of molecule M continues during its passage through an aperture in wall 13 and persists in cavity 12 until the molecule strikes the far wall of that cavity. The spacing between the far wall defining cavity 12 and the diffusion wall 13 is many times greater than λ, for example 10λ (where λ is one wavelength for the molecular resonant frequency of the gas). As all molecules in cavity 11 take approximately the same time to cross it before they pass through the diffusion wall, they will all be excited more or less to the oscillatory state. Consequently all molecules entering cavity 12 from cavity 11 will be oscillating in phase and serve as a source of coherent radiation at a molecular resonance frequency which is characteristic of the particular gas.

The axially aligned passages 14 in the common wall 13 serve to collimate the excited molecules into a radiating beam since those molecules which collide with the side walls of the apertures during their passage therethrough from cavity 11 are returned to non-oscillatory state and hence do not radiate in cavity 12. The only molecules which are in condition to radiate in cavity 12 are those which pass freely through the openings or passages 14. These molecules form a well-defined beam in which the molecules are oscillating in phase with a polarization parallel to their direction of motion. As all the radiating molecules in cavity 12 are moving in the same direction, and toward the far wall of the cavity, they all travel a substantial distance before colliding with a wall of the cavity and consequently radiate during many cycles of their molecular resonant frequency. These molecules therefore serve as a coherent signal source sharply tuned to the resonant frequency of the molecules. This is true even though the exciting frequency of the microwave energy in cavity 11 may include frequencies in addition to that corresponding with a molecular resonant frequency of the molecules.

The gas may be confined within the two cavities of cell 10 by plates having windows 16 of mica or other suitable material which is impervious to the gas but substantially transparent to microwave energy. As shown in Fig. 1, these windows may be respectively at the delivery end of the input waveguide 9 and at the receiving end of the output waveguide 17. Preferably the cavity 12 is tunable as by the slidable plunger 15 so that it is excited by the gas signal in the mode for which the electric field E is parallel to the path of the radiating molecules. The sliding contact between the tuning plunger and the cavity walls may be made gas-tight by any of the greases used in vacuum pump techniques.

In the modification shown in Figs. 2 to 4, the elements corresponding with elements of Fig. 1 have been identified by corresponding reference characters with addition of the suffix b. The foregoing descriptive matter with reference to Fig. 1 is directly applicable thereto. In this modification, whose description is substantially confined to features not shown in Fig. 1, the pipe or tube 18b of cell 10b is provided for admission of gas from any suitable source under control of valve 19b. The pipe or tube 18b is for connection to an exhaust pump for reduction of pressure of the gas in cell 10b to suitably low value. The plunger 15b for tuning of cavity 12b is adjustable by a micrometer head 21 secured at one end of the cell by a locking screw 22. The plunger 15b may be adjusted to tune cavity 12b by turning the micrometer barrel 23. The micrometer scales may be used to set the plunger in accordance with a frequency calibration chart.

By way of specific example, the diameter of the gas radiation cavity 12b of Fig. 2 is ⅜ inch: as the figure is drawn approximately to scale, the dimensions of the other components may thus be determined. The pattern of the apertures of the diffusion plate 13b is approximately ¼ inch square, the holes are approximately 0.020 inch in diameter and there are 113 holes. This cell was used for ammonia gas and for studies related to the 3—3 line of ammonia whose molecular resonance frequency is 23.8701 kilomegacycles.

The cells 10, 10b of Figs. 1 to 3 are particularly useful in microwave spectoroscopy and frequency-stabilization in pulsed systems such as disclosed, for example, in copending applications Serial No. 388,523 and Serial No. 388,524, filed concurrently herewith.

The gas cell 10a of Fig. 5 is generally similar in construction to that of Fig. 1 and the same reference characters with addition of the suffix a are used to identify the corresponding elements. The cell 10a is particularly useful as a high-Q filter which selects from the microwave power supplied to the gas cell by waveguide 9 only a very narrow band of frequencies which are essentially the same as a molecular resonance frequency of the gas so that the signal passed to the output waveguide 17 is substantially only microwave power of that frequency. As in Fig. 1, the common conductive wall 13a between the two chambers 11a, 12a precludes any direct transfer of microwave energies between the two cavities of the filter. The only coupling between the cavities is that afforded by the gas which diffuses between the cavities and which is excited into oscillatory state in cavity 11a and radiates at a frequency characteristic of the gas in the cavity 12a. It is to be noted that the filter pass frequency is not dependent upon the dimensions or geometry of the cell but upon the molecular resonance characteristics of the selected gas. With this gas filter construction, a Q of 100,000 is realizable: For example, the bandwith at frequencies of the order of 34 kilomegacycles is 150 kilocycles.

For such filtering purposes, no attempt need be made to effect collimation of the molecular beam. The wall 13a of Fig. 5 may be of thin sheet metal or screen as distinguished from the wall 13 of Fig. 1 which should be of appreciable thickness to effect high degree of collimation. Preferably and as shown in Fig. 5, the microwave gas filter is essentially two sections of waveguide having a common wide face with apertures 14a therethrough for gas diffusion. The ends of the cell are hermetically sealed by plates having windows 16a, 16b which permit ingress and egress of microwave energy.

With the microwave filter of Fig. 5, different discrete pass frequencies are made available by use of different gases having different molecular resonance frequencies, or since many gases exhibit widely spaced molecular frequencies, the same filter and gas can be used for such different frequencies.

When it is desired to tune the filter of Fig. 5 to pass a frequency somewhat displaced from a natural molecular resonant frequency of the gas, the gas in cell 10a may, as in Fig. 6, be subjected to a magnetic field such as that produced by coil 24 whose axis is normal to the direction of diffusion of the gas between the two cavities of the cell. The extent of displacement of the gas line, and hence the pass-frequency of the filter, may be varied by controlling the intensity of the magnetic field in any suitable manner. For example, the field intensity may be varied as by a switch 26 which controls the number of energized turns of the coil, or alternatively, or in addition, the strength of the field may be varied by controlling the current from any suitable direct-current source exemplified by the variably tapped battery 25.

Furthermore by varying the spacing of turns in the coil 24, the resulting static magnetic field will be caused to be inhomogeneous, in which case the filter instead of being sharply tuned can be caused to have a pass band of predetermined width and transmission characteristic.

Another way in which the pass band may be increased or decreased is by changing the height of the waveguides 11a and 12a.

The cell 10a may also be used as a microwave modulator by varying the intensity of the magnetic field in accordance with the desired modulation. For example, and as schematicaly shown, the modulator 27 may be coupled as by a transformer 28 or equivalent coupling impedance to superimpose the modulating frequency or pulses upon the energizing current of the coil 24. For such purpose the switch 29 is of course open whereas for simple tuning of the filter, the switch 29 is in a closed position. By such utilization of the Zeeman effect, the radiation from the excited gas molecules which pass through the diffusion screen 13a into the cavity 12a is amplitude-modulated.

The pass frequency of the gas cell filter 10a of Fig. 5 may also be shifted incrementally or in accordance with modulation by utilization of the Stark effect. A suitable arrangement for such purpose is shown in Fig. 7 in which the Stark electrodes 31, 31 are respectively disposed in the cavities 11c, 12c on opposite sides of the diffusion screen 13c. The frequency of the radiation from the gas molecules passed by the diffusion screen from the exciting cavity 11c may be varied by changing the direct-current potential of the Stark electrodes in any suitable manner. As schematicaly shown, the source of variable direct-current potential may be a tapped high-voltage battery or source 25. Amplitude-modulation of the radiation from the excited molecules in cavity 11c may be effected by superimposing the modulating signal upon the biasing potential of the Stark electrodes. Specifically and as schematicaly shown, the modulator 27 is suitably coupled to the filter as by a modulation transformer 28 or equivalent coupling impedance in circuit with the Stark electrodes.

In the gas cells of Figs. 6 and 7, like those previously described, there is no appreciable direct transfer of energy from one to the other of the cavities of the gas cell. The microwave energy in cavity resonator 11c serves simply to excite the gas molecules into oscillatory state at a molecular resonance frequency of the gas and the excited molecules, after passage through the diffusion screen 13c, serve as a primary source of radiation in the cavity resonator or chamber 12c. The molecules which diffuse from cavity 12c back into chamber 11c are in non-oscillatory state.

What is claimed is:

1. A cell for containing gas exhibiting molecular resonance when excited by microwave energy comprising two chambers having a common wall with apertures in said wall permitting diffusion of molecules of said gas between said chambers, one of said chambers providing for excitation of said gas by microwave energy, the apertures in said common wall being cut-off dimensions at the wavelength of said microwave energy and at the wavelength of a molecular resonance frequency of said gas thereby precluding direct electromagnetic transfer of said energy to the other of said chambers and permitting transfer of energy between said chambers at a molecular resonance frequency of said gas solely as radiation from excited gas molecules freely passed by said apertures.

2. A cell as in claim 1 in which said one of the chambers is a waveguide whose boundary dimensions are of the order of the mean free path of the gas molecules.

3. A cell as in claim 1 in which said other of said chambers is a cavity resonator resonant at the frequency of the radiation from excited molecules passed by the apertured wall from said one of the chambers.

4. A cell as in claim 1 in which said common wall is of substantial thickness and in which said apertures are aligned passages permitting, without collision on their side walls, transfer from said one to said other of the chambers of only those excited molecules having the same direction of movement thereby to obtain coherence of said radiation in said other of the chambers.

5. A gas cell as in claim 1 additionally provided with means for producing a magnetic field within said chambers to determine the frequency at which energy may be transferred by the gas from said one to the other of said chambers.

6. A gas cell as in claim 5 in which the field-producing means is oriented to produce a magnetic field transverse to the direction of diffusion of the gas through said apertured wall.

7. A gas cell as in claim 5 in which the intensity of said field is varied to amplitude-modulate the radiation from excited molecules passed by said apertured wall to said other of the chambers.

8. A gas cell as in claim 5 in which the intensity of said magnetic field is adjusted to select the frequency at which energy may be transferred between said chambers by the gas.

9. A gas cell as in claim 1 additionally provided with means for producing an electric field within said chambers to determine the frequency at which energy may be transferred by the gas from said one to the other of said chambers.

10. A gas cell as in claim 9 in which the field-producing means is oriented to produce an electric field parallel to the direction of diffusion of gas through said apertured wall.

11. A gas cell as in claim 9 in which the intensity of said electric field is varied to amplitude-modulate the radiation from excited molecules passed by said apertured wall to said other of the chambers.

12. A gas cell as in claim 9 in which the intensity of said electric field is adjusted to select the frequency at which energy may be transferred between said chambers by the gas.

13. A high-Q microwave filter comprising an input chamber, an output chamber, said chambers having an apertured common wall having apertures therein of cut-off dimensions at the wavelength of input microwave energy and at the wavelength of a molecular resonance frequency of said gas thereby precluding direct electromagnetic transfer of microwave energy between said chambers, and a body of gas at low pressure confined in said chambers and diffusible through said apertured wall, said gas when excited at a molecular resonance frequency thereof in said input chamber serving as a source of radiation of that frequency in said output chamber after passage thereto through said wall.

14. A microwave modulator comprising an input chamber for receiving unmodulated microwave energy, an output chamber, said chambers having an apertured common wall having apertures therein of cut-off dimensions at the wavelength of input microwave energy and at the wavelength of a molecular resonance frequency of said gas thereby blocking direct electromagnetic transfer of said microwave energy to said output chamber, a body of gas confined in said chambers, said gas being excited at a molecular resonance frequency in said input chamber and serving as a source of radiation at that frequency in said output chamber after passage thereto through said wall, and modulated field-producing means for shifting the molecular resonance frequency of the gas to modulate the radiation emanating from the gas in said output chamber.

15. Apparatus for selectively transferring microwave power from a first transmission path to a second transmission path which comprises means for exciting a body of gas in a first path with microwave energy so that molecules of said gas possess oscillatory dipole moments at a resonance frequency of said gas, and means for precluding direct electromagnetic transfer of energy between said first and second transmission paths while effecting transfer of microwave energy from said first transmission path to said second transmission path at said gas resonance frequency solely by transfer of the molecules of said gas from said first path to said second path in excited state there to serve as a source of radiation.

16. Apparatus for effectively sharpening an absorption line of a molecularly resonant gas which comprises means for exciting the gas by microwave energy to effect oscillation of molecules thereof, means for segregating the excited gas molecules which are oscillating coherently, and means for deriving electromagnetic power from the segregated molecules.

17. Apparatus as claimed in claim 15 including means for applying a field to said gas molecules to modulate energy coupled from said first transmission path to said second transmission path.

References Cited in the file of this patent

UNITED STATES PATENTS

| 2,051,537 | Wolff et al. | Aug. 18, 1936 |
| 2,524,290 | Hershberger | Oct. 3, 1950 |
| 2,555,131 | Hershberger | May 29, 1951 |
| 2,591,258 | Hershberger | Apr. 1, 1952 |
| 2,725,531 | Fiske | Nov. 29, 1955 |
| 2,738,470 | Norton | Mar. 13, 1956 |

FOREIGN PATENTS

| 644,749 | Great Britain | Oct. 18, 1950 |